(12) United States Patent
Kim et al.

(10) Patent No.: US 8,976,752 B2
(45) Date of Patent: Mar. 10, 2015

(54) TERMINAL DEVICE AND METHOD FOR TRANSMITTING A POWER HEADROOM REPORT IN A WIRELESS COMMUNICATION SYSTEM SUPPORTING MULTIPLE COMPONENT CARRIERS

(75) Inventors: Dongcheol Kim, Anyang-si (KR); Hangyu Cho, Anyang-si (KR); Jaehoon Chung, Angyang-si (KR)

(73) Assignee: LG Electronics Inc., Seoul (KR)

( * ) Notice: Subject to any disclaimer, the term of this patent is extended or adjusted under 35 U.S.C. 154(b) by 112 days.

(21) Appl. No.: 13/811,246

(22) PCT Filed: Jul. 21, 2011

(86) PCT No.: PCT/KR2011/005388
§ 371 (c)(1),
(2), (4) Date: Jan. 18, 2013

(87) PCT Pub. No.: WO2012/011757
PCT Pub. Date: Jan. 26, 2012

(65) Prior Publication Data
US 2013/0121297 A1    May 16, 2013

Related U.S. Application Data

(60) Provisional application No. 61/366,159, filed on Jul. 21, 2010, provisional application No. 61/367,442, filed on Jul. 25, 2010, provisional application No. 61/375,037, filed on Aug. 19, 2010.

(30) Foreign Application Priority Data

Jul. 21, 2011 (KR) ........................ 10-2011-0072490

(51) Int. Cl.
*H04W 52/36* (2009.01)
*H04L 5/00* (2006.01)
*H04W 52/34* (2009.01)

(52) U.S. Cl.
CPC ............. *H04W 52/365* (2013.01); *H04L 5/001* (2013.01); *H04L 5/006* (2013.01); *H04L 5/0094* (2013.01); *H04L 5/0032* (2013.01); *H04W 52/34* (2013.01); *Y02B 60/50* (2013.01)
USPC .......................................... 370/329; 370/311

(58) Field of Classification Search
CPC .... H04W 52/365; H04W 52/34; H04L 5/001; H04L 5/0094; H04L 5/0032; H04L 5/006; Y02B 60/50
USPC .................. 370/329, 330, 343, 344, 478, 311
See application file for complete search history.

(56) References Cited

U.S. PATENT DOCUMENTS

2009/0191910 A1*  7/2009  Athalye et al. ................ 455/522
2010/0111023 A1*  5/2010  Pelletier et al. ............... 370/329
(Continued)

FOREIGN PATENT DOCUMENTS

JP    2008-236154    10/2008
KR   10-2006-0019153   3/2006
(Continued)

*Primary Examiner* — Brian D Nguyen
(74) *Attorney, Agent, or Firm* — McKenna Long & Aldridge LLP

(57) ABSTRACT

The present invention relates to a terminal device and method for transmitting a power headroom report (PHR) in a wireless communication system supporting multiple component carriers. The terminal device of the present invention comprises a transmitter for transmitting, to a base station, PHR information on at least one component carrier and information on the maximum power reduction (MPR) of the terminal device, wherein the PHR information on the at least one component carrier includes component carrier index information, and the MPR information of the terminal device may be an MPR value of said at least one component carrier, or a sum of the MPR values of said at least one component carrier.

15 Claims, 6 Drawing Sheets

| T | R | R | R | R | Cell Index | Oct 1 |
| R | R | | | | PH | Oct 2 |

(56) References Cited

U.S. PATENT DOCUMENTS

| | | | |
|---|---|---|---|
| 2010/0158147 A1* | 6/2010 | Zhang et al. | 375/260 |
| 2010/0273515 A1* | 10/2010 | Fabien et al. | 455/509 |
| 2011/0038271 A1* | 2/2011 | Shin et al. | 370/252 |
| 2011/0111788 A1* | 5/2011 | Damnjanovic et al. | 455/522 |
| 2011/0150117 A1* | 6/2011 | Zhou et al. | 375/260 |
| 2011/0268045 A1* | 11/2011 | Heo et al. | 370/329 |

FOREIGN PATENT DOCUMENTS

| | | |
|---|---|---|
| KR | 10-2008-0078617 | 8/2008 |
| KR | 10-2010-0062709 | 6/2010 |

\* cited by examiner (a)

(b)

TERMINAL DEVICE AND METHOD FOR TRANSMITTING A POWER HEADROOM REPORT IN A WIRELESS COMMUNICATION SYSTEM SUPPORTING MULTIPLE COMPONENT CARRIERS

This application is a 35 U.S.C. §371 national stage entry of International Application No. PCT/KR2011/005388, filed on Jul. 21, 2011, and claims benefit of and priority to U.S. Provisional Application Ser. Nos. 61/366,159, filed, Jul. 21, 2010; 61/367,442, filed Jul. 25, 2010; and 61/375,037, filed Aug. 19, 2010; and Korean Patent Application No. 10-2011-0072490, filed Jul. 21, 2011, the disclosures of which are incorporated by reference herein in their entireties.

FIELD OF THE INVENTION

The present invention relates to a wireless communication system, and more particularly to a method and apparatus for determining precoding information for uplink (UL) Multiple Input Multiple Output (MIMO) transmission.

BACKGROUND ART

As a representative example of a wireless communication system of the present invention, $3^{rd}$ Generation Partnership Project Long Term Evolution (3GPP LTE) and LTE-Advanced (LTE-A) communication systems will hereinafter be described in detail.

FIG. 1 is a conceptual diagram illustrating an Evolved Universal Mobile Telecommunications System (E-UMTS) network structure as an exemplary mobile communication system. In particular, the Enhanced Universal Mobile Telecommunications System (E-UMTS) has evolved from a legacy UMTS system, and basic standardization thereof is now being conducted by the 3rd Generation Partnership Project (3GPP). E-UMTS may also be referred to as Long Term Evolution (LTE). For details of the technical specifications of UMTS and E-UMTS, refer to Release 7 and Release 8 of "3rd Generation Partnership Project; Technical Specification Group Radio Access Network".

As shown in FIG. 1, the E-UMTS system is broadly made up of a User Equipment (UE) 120, base stations (or eNode-Bs) 110a and 110b, and an Access Gateway (AG) which is located at an end of a network (E-UTRAN) and is connected to an external network. Generally, an eNode-B can simultaneously transmit multiple data streams for a broadcast service, a multicast service and/or a unicast service.

Each eNode-B includes one or more cells. One cell of the eNode-B is set to use a bandwidth such as 1.25, 2.5, 5, 10, 15 or 20 MHz to provide a downlink or uplink transmission service to user equipments (UEs). Here, different cells may be set to use different bandwidths. The eNode-B controls transmission and reception of data for several UEs. In association with downlink (DL) data, the eNode-B transmits downlink (DL) scheduling information to a corresponding UE, so as to inform the corresponding UE of time/frequency domains where data is to be transmitted, coding information, data size information, Hybrid Automatic Repeat and reQuest (HARM)—related information, and the like. In association with uplink (UL) data, the eNode-B transmits UL scheduling information to the corresponding UE, so that it informs the corresponding UE of time/frequency domains capable of being used by the corresponding UE, coding information, data size information, HARQ-related information, and the like. An interface for transmission of user traffic or control traffic may be used between eNode-Bs. A Core Network (CN) may include an Access Gateway (AG) and a network node for user registration of the UE. The AG manages mobility of a UE on the basis of a Tracking Area (TA) composed of several cells.

Although wireless communication technology has been developed to LTE technology on the basis of WCDMA technology, users and enterprises continuously demand new features and services. In addition, other wireless access technologies are being developed, such that there is a need for new or improved wireless access technology in order to remain competitive in the long run. For example, reduction in cost per bit, increase of service availability, adaptive frequency band utilization, a simple structure, an open-type interface, and appropriate user equipment (UE) power consumption are needed for new or improved wireless access technology.

Recently, 3GPP has been establishing a standard task for a subsequent technique of LTE. In this specification, such a technique is referred to as "LTE-Advanced" or "LTE-A". One of the main differences between an LTE system and an LTE-A system is a system bandwidth and the introduction of a Relay Node (RN).

The LTE-A system is aimed at supporting a broadband of a maximum of 100 MHz, and to this end, the LTE-A system is designed to use a carrier aggregation or bandwidth aggregation technique using a plurality of frequency blocks.

Carrier aggregation employs a plurality of frequency blocks as one big logical frequency band in order to use a wider frequency band. A bandwidth of each frequency block may be defined based on a bandwidth of a system block used in the LTE system. Each frequency block is transmitted using a component carrier.

Although carrier aggregation technology is applied to an LTE-A system, as a next generation communication system, it is impossible for a conventional multi-carrier system to support an uplink power control operation of the UE. In addition, a method for enabling the UE to report a power headroom report (PHR) for multiple carriers, and a PHR configuration method and format for PHR transmission have not yet been disclosed in the related art.

DETAILED DESCRIPTION OF THE INVENTION

Technical Problem

An object of the present invention is to provide a method for enabling a user equipment (UE) to transmit a power headroom report (PHR) in a wireless communication system supporting a plurality of component carriers (CCs).

Another object of the present invention is to provide a user equipment (UE) for transmitting a power headroom report (PHR) in a wireless communication system supporting a plurality of component carriers (CCs).

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transmitting a power headroom report (PHR) by a user equipment (UE) in a wireless communication system supporting multiple component carriers including: transmitting PHR information for each at least one component carrier (CC) and Maximum Power Reduction (MPR)

information of the UE to a base station (BS), wherein PHR information for each the at least one component carrier includes component carrier index information, and MPR information of the UE is an MPR value for each the at least one component carrier or a sum of MPR values of individual component carriers. The PHR information for each the at least one component carrier further may include power headroom report (PHR) type information. The PHR type may include a first type PHR and a second type PHR, the first type PHR being represented by the following equation A and the second type PHR being represented by the following equation B:

$$\text{Type 1 PHR} = P_{cmax} - P_{PUSCH} \quad \text{[Equation A]}$$

$$\text{Type 2 PHR} = P_{cmax} - P_{PUCCH} - P_{PUSCH} \quad \text{[Equation B]}$$

wherein $P_{cmax}$ is a UE-configured maximum transmission value per component carrier, $P_{PUSCH}$ is a power value used for PUSCH transmission, and $P_{PUCCH}$ is a power value used for PUCCH transmission. The PHR information of a secondary cell (SCell) corresponding to a secondary component carrier (SCC) of the at least one component carrier may be the second type PHR. The PHR information of a primary cell (PCell) corresponding to a primary component carrier (PCC) of the at least one component carrier may include the first type PHR and the second type PHR. The PHR information for each the at least one component carrier or the UE MPR information may be transmitted when PUSCH transmission occurs in a specific component carrier from among the at least one component carrier.

The method may further include: transmitting per-UE PHR information to the base station (BS), wherein the per-UE PHR information corresponds to a value obtained when any one of a sum of scheduled Physical Uplink Shared Channel (PUSCH) powers, a sum of scheduled Physical Uplink Control Channels (PUCCHs), a sum of PUSCHs at an SCell corresponding to a unscheduled secondary component carrier, and a sum of PUCCHs of a PCell corresponding to a unscheduled primary component carrier is subtracted from a predetermined total maximum power of the UE.

The PHR information for each the at least one component carrier (per-CC PHR information) and the per-UE PHR information may be transmitted through the same PHR MAC CE (Control Element) format. The PHR MAC CE format may include a field for a PHR value and a field for discriminating between the per-CC PHR information and the per-UE PHR information. The PHR MAC CE format for the PHR information for each the at least one component carrier may further include a field including the component carrier index information, and the field for the PHR value may include at least one of a first type PHR value and a second type PHR value. The at least one component carrier may be all component carriers allocated to the UE or a scheduled component carrier.

In another aspect of the present invention, a user equipment (UE) apparatus for transmitting a power headroom report (PHR) in a wireless communication system supporting multiple component carriers includes: a transmitter for transmitting PHR information for each at least one component carrier (CC) or Maximum Power Reduction (MPR) information of the UE to a base station (BS), wherein PHR information for each the at least one component carrier includes component carrier index information, and MPR information of the UE is an MPR value for each the at least one component carrier or a sum of MPR values of individual component carriers.

The PHR information for each the at least one component carrier may further include power headroom report (PHR) type information. The transmitter may further transmit per-UE PHR information to a base station (BS), wherein the PHR information for each the at least one component carrier (per-CC PHR information) and the per-UE PHR information are transmitted through the same PHR MAC CE (Control Element) format. The PHR MAC CE format may include a field for a PHR value and a field for discriminating between the per-CC PHR information and the per-UE PHR information.

Effects of the Invention

As is apparent from the above description, exemplary embodiments of the present invention have the following effects. A UE power headroom required for a UE and BS supporting a DL/UL multicarrier system is configured, PHR information per UL CC and PHR information per UE are efficiently configured, resources for the BS can be easily managed, and maximum power limitation of the UE can be minimized.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP LTE system, but the present invention is not limited thereto and the remaining parts of the present invention other than unique characteristics of the 3GPP LTE system are applicable to other mobile communication systems.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS) and the like. Also, the base station (BS) may refer to an arbitrary node of a network end which communicates with the above terminal, and may include an eNode B (eNB), a Node B (Node-B), an access point (AP) and the like.

In a mobile communication system, the UE may receive information from the base station (BS) via a downlink, and may transmit information via an uplink. The information that is transmitted and received to and from the UE includes data and a variety of control information. A variety of physical channels are used according to categories of transmission (Tx) and reception (Rx) information of the UE.

Figure 1:
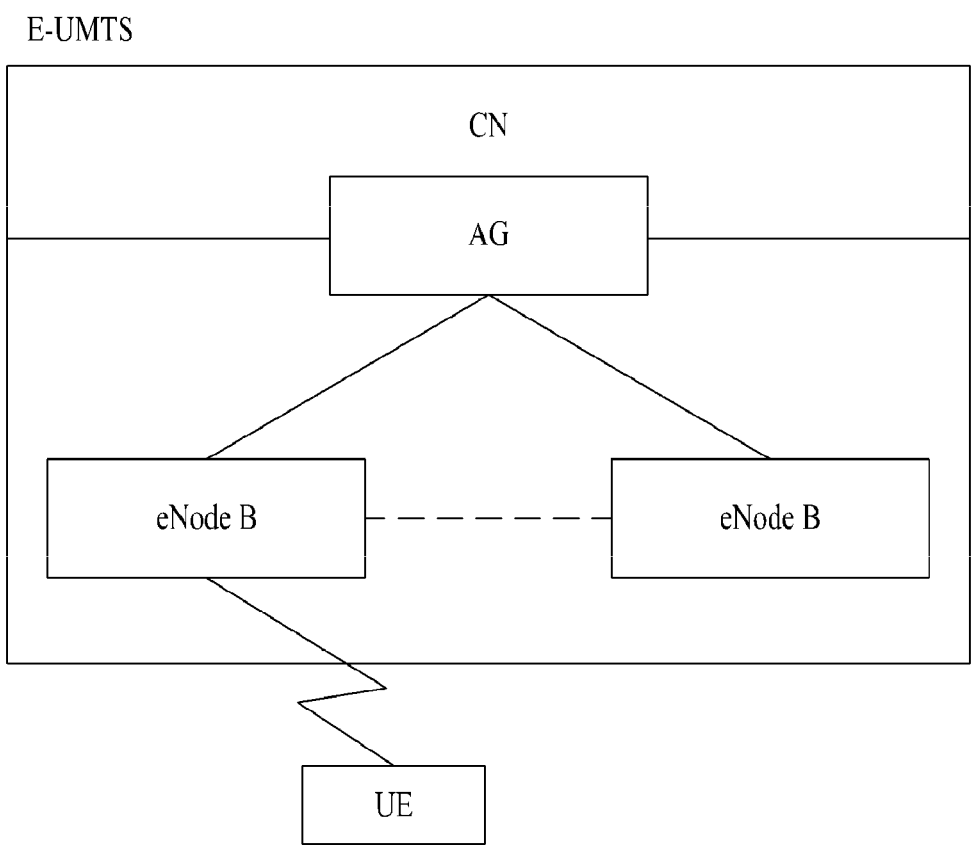
FIG. 1 is a conceptual diagram illustrating an Evolved Universal Mobile Telecommunications System (E-UMTS) network structure as an example of a wireless communication system.
Figure 2:
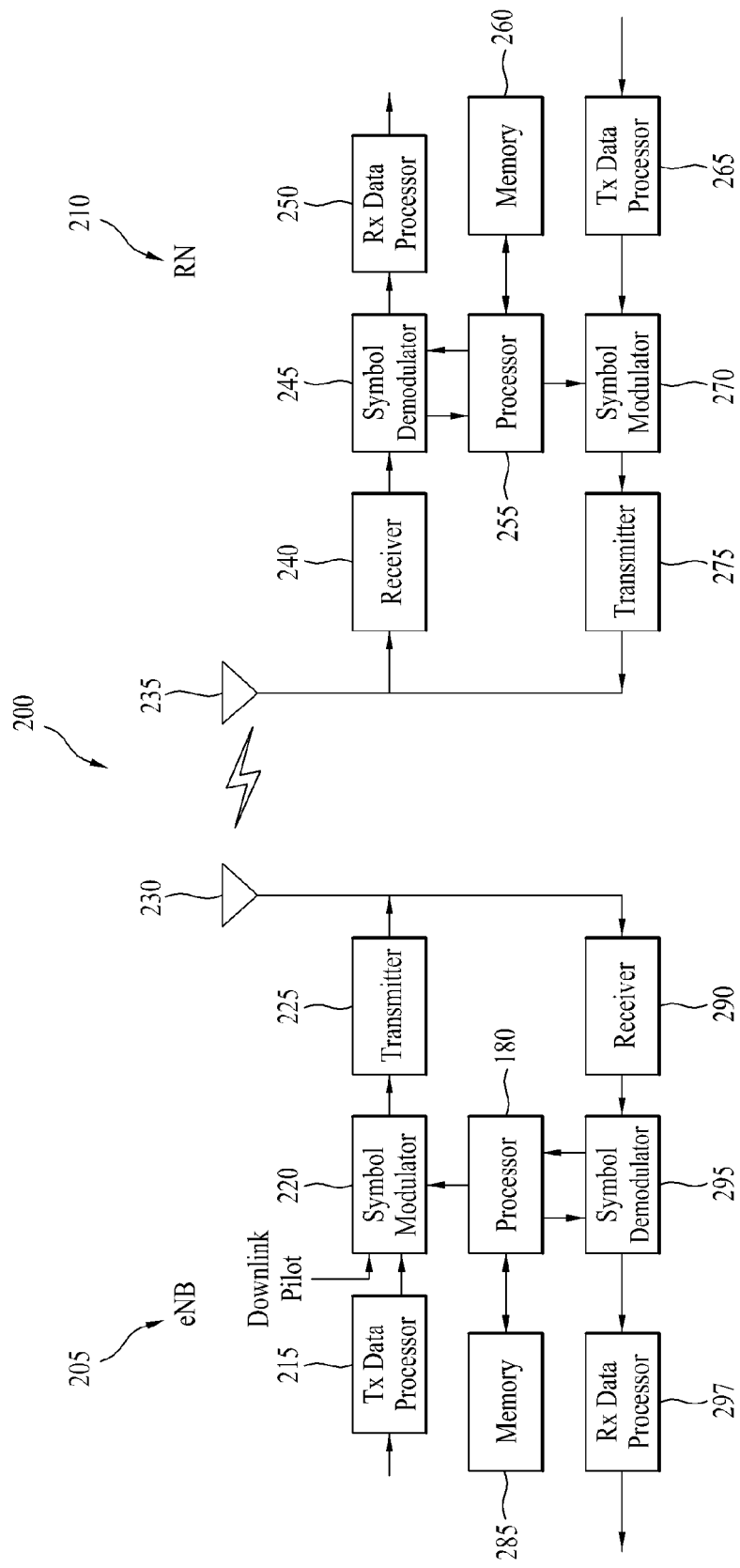
FIG. 2 is a block diagram illustrating a base station (BS) and a user equipment (UE) for use in a wireless communication system.

FIG. 2 is a block diagram illustrating a base station (BS) 205 and a user equipment (UE) 210 for use in a wireless communication system 200 according to the present invention.

Although FIG. 2 shows one BS 205 and one UE 210 for brief description of the wireless communication system 200, it should be noted that the wireless communication system 200 may further include one or more BSs and/or one or more UEs.

Referring to FIG. 2, the BS 205 may include a transmission (Tx) data processor 215, a symbol modulator 220, a transmitter 225, a transmission/reception antenna 230, a processor 280, a memory 285, a receiver 290, a symbol demodulator 295, and a reception (Rx) data processor 297. The UE 210 may include a Tx data processor 265, a symbol modulator 270, a transmitter 275, a transmission/reception antenna 235, a processor 255, a memory 260, a receiver 240, a symbol demodulator 255, and a Rx data processor 250. In FIG. 2, although one antenna 230 is used for the BS 205 and one antenna 235 is used for the UE 210, each of the BS 205 and the UE 210 may also include a plurality of antennas as necessary. Therefore, the BS 205 and the UE 210 according to the present invention support a Multiple Input Multiple Output (MIMO) system. The BS 205 according to the present invention can support both a Single User-MIMO (SU-MIMO) scheme and a Multi User-MIMO (MU-MIMO) scheme.

In downlink, the Tx data processor 215 receives traffic data, formats the received traffic data, codes the formatted traffic data, and interleaves the coded traffic data, and modulates the interleaved data (or performs symbol mapping upon the interleaved data), such that it provides modulation symbols (i.e., data symbols). The symbol modulator 220 receives and processes the data symbols and pilot symbols, such that it provides a stream of symbols.

The symbol modulator 220 multiplexes data and pilot symbols, and transmits the multiplexed data and pilot symbols to the transmitter 225. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 225 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the antenna 230 transmits the downlink signal to the UE.

Configuration of the UE 210 will hereinafter be described in detail. The antenna 235 of the UE 210 receives a DL signal from the BS 205, and transmits the DL signal to the receiver 240. The receiver 240 performs adjustment (e.g., filtering, amplification, and frequency downconversion) of the received DL signal, and digitizes the adjusted signal to obtain samples. The symbol demodulator 245 demodulates the received pilot symbols, and provides the demodulated result to the processor 255 to perform channel estimation.

The symbol demodulator 245 receives a frequency response estimation value for downlink from the processor 255, demodulates the received data symbols, obtains data symbol estimation values (indicating estimation values of the transmitted data symbols), and provides the data symbol estimation values to the Rx data processor 250. The Rx data processor 250 performs demodulation (i.e., symbol-demapping) of data symbol estimation values, deinterleaves the demodulated result, decodes the deinterleaved result, and recovers the transmitted traffic data.

The processing of the symbol demodulator 245 and the Rx data processor 250 is complementary to that of the symbol modulator 220 and the Tx data processor 215 in the eNB 205.

The Tx data processor 265 of the UE 210 processes traffic data in uplink, and provides data symbols. The symbol modulator 270 receives and multiplexes data symbols, and modulates the multiplexed data symbols, such that it can provide a stream of symbols to the transmitter 275. The transmitter 275 receives and processes the stream of symbols to generate an uplink (UL) signal, and the UL signal is transmitted to the BS 205 through the antenna 235.

The BS 205 receives the UL signal from the UE 210 through the antenna 230. The receiver processes the received UL signal to obtain samples. Subsequently, the symbol demodulator 295 processes the symbols, and provides pilot symbols and data symbol estimation values received via uplink. The Rx data processor 297 processes the data symbol estimation value, and recovers traffic data received from the UE 210.

Processor 255 or 280 of the UE 210 or the BS 205 commands or indicates operations of the UE 210 or the BS 205. For example, the processor 255 or 280 of the UE 210 or the BS 205 controls, adjusts, and manages operations of the UE 210 or the BS 205. Each processor 255 or 280 may be connected to a memory unit 260 or 285 for storing program code and data. The memory 260 or 285 is connected to the processor 255 or 280, such that it can store the operating system, applications, and general files.

The processor 255 or 280 may also be referred to as a controller, a microcontroller), a microprocessor, a microcomputer, etc. In the meantime, the processor 255 or 280 may be implemented by various means, for example, hardware, firmware, software, or a combination thereof. In a hardware configuration, methods according to the embodiments of the present invention may be implemented by the processor 255 or 280, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 255 or 280 or the memory unit 260 or 285, such that it can be driven by the processor 255 or 280.

Radio interface protocol layers among the UE 210, the eNB 205, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 210 and the eNB 205 may exchange RRC messages with each other through the wireless communication network and the RRC layer.

Figure 3:
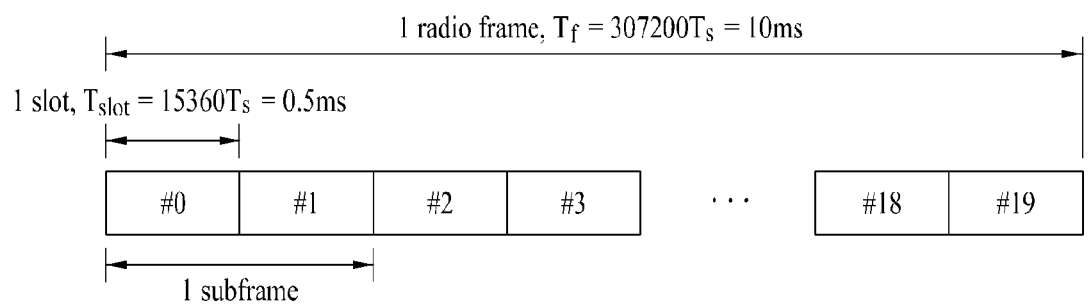
FIG. 3 is a diagram illustrating a structure of a radio frame used in a 3GPP LTE system acting as an exemplary mobile communication system.

FIG. 3 is a diagram illustrating a structure of a radio frame used in a 3GPP LTE system acting as a mobile communication system.

Referring to FIG. 3, the radio frame has a length of 10 ms ($327200*T_s$) and includes 10 subframes of equal size. Each subframe has a length of 1 ms and includes two slots. Each slot has a length of 0.5 ms ($15360*T_s$). In this case, $T_s$ represents a sampling time, and is expressed by '$T_s=1/(15 kHz*2048)=3.2552*10^{-8}$ (about 33 ns)'. The slot includes a plurality of OFDM or SC-FDMA symbols in a time domain, and includes a plurality of resource blocks (RBs) in a frequency domain.

In the LTE system, one resource block includes twelve (12) subcarriers*seven (or six) OFDM (Orthogonal Frequency Division Multiplexing) symbols. A Transmission Time Interval (TTI) which is a transmission unit time of data can be determined in a unit of one or more subframes. The aforementioned structure of the radio frame is only exemplary, and various modifications can be made to the number of subframes contained in the radio frame or the number of slots contained in each subframe, or the number of OFDM or SC-FDMA symbols in each slot.

Figure 4:
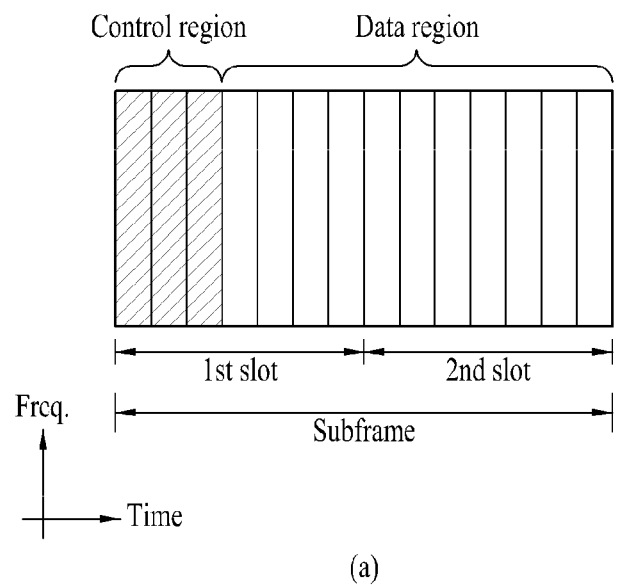
FIGS. 4A and 4B are exemplary structural diagrams illustrating downlink and uplink subframes for use in a 3GPP LTE system acting as an exemplary mobile communication system according to the present invention.
Figure 4:
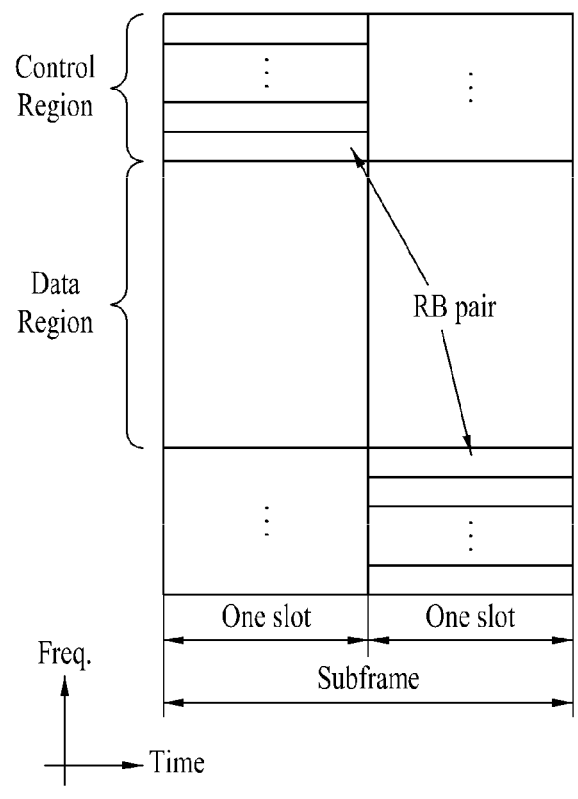

FIG. 4 is an exemplary structural diagram illustrating downlink and uplink subframes for use in a 3GPP LTE system acting as an exemplary mobile communication system according to the present invention.

Referring to FIG. 4(a), one downlink subframe includes two slots in a time domain. A maximum of three OFDM symbols located in the front of the downlink subframe are used as a control region to which control channels are allocated, and the remaining OFDM symbols are used as a data region to which a Physical Downlink Shared Channel (PDSCH) channel is allocated.

DL control channel for use in the 3GPP LTE system includes a Physical Control Format Indicator CHannel (PCFICH), a Physical Downlink Control Channel (PDCCH), a Physical Hybrid-ARQ Indicator CHannel (PHICH), and the like. The traffic channel includes a Physical Downlink Shared CHannel (PDSCH). PCFICH transmitted through a first OFDM symbol of the subframe may carry information about the number of OFDM symbols (i.e., the size of control region) used for transmission of control channels within the subframe. Control information transmitted through PDCCH is referred to as downlink control information (DCI). The DCI may indicate UL resource allocation information, DL resource allocation information, UL transmission power control commands of arbitrary UE groups, etc. PHICH may carry ACK (Acknowledgement)/NACK (Not-Acknowledgement) signals about an UL Hybrid Automatic Repeat Request (UL HARQ). That is, the ACK/NACK signals about UL data transmitted from the UE are transmitted over PHICH.

PDCCH acting as a DL physical channel will hereinafter be described in detail.

A base station (BS) may transmit information about resource allocation and transmission format (UL grant) of the PDSCH, resource allocation information of the PUSCH, information about Voice over Internet Protocol (VoIP) activation, etc. A plurality of PDCCHs may be transmitted within the control region, and the UE may monitor the PDCCHs. Each PFCCH includes an aggregate of one or more contiguous control channel elements (CCEs). The PDCCH composed of the aggregate of one or more contiguous CCEs may be transmitted through the control region after performing subblock interleaving. CCE is a logical allocation unit for providing a coding rate based on a Radio frequency (RF) channel status to the PDCCH. CCE may correspond to a plurality of resource element groups. PDCCH format and the number of available PDCCHs may be determined according to the relationship between the number of CCEs and the coding rate provided by CCEs.

Control information transmitted over PDCCH is referred to as downlink control information (DCI). The following Table 1 shows DCIs in response to DCI formats.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

In Table 1, DCI format 0 may indicate uplink resource allocation information. DCI format 1 and DCI format 2 may indicate downlink resource allocation information. DCI format 3 and DCI format 3A may indicate uplink transmit power control (TPC) commands for arbitrary UE groups.

DCI format 3/3A includes TPC commands of a plurality of UEs. In case of DCI format 3/3A, the eNB is masked onto CRC. TPC-ID is an ID that is demasked by a UE that monitors a PDCCH carrying a TPC command. TPC-ID may be an ID used by a UE that decodes a PDCCH to decide transmission or non-transmission of the TPC command over the PDCCH. TPC-ID may be defined by reusing conventional IDs (i.e., C-RNTI (Radio Network Temporary Identifier), PI-RNTI, SC-RNTI, or RA-RNTI), or may be defined as a new ID. TPC-ID is an ID for UEs of a specific aggregate contained in a cell, such that it is different from C-RNTI acting as an ID of a specific UE. In addition, the TPC_ID is also different from IDs (e.g., PI-RNTI, SC-RNTI and RA-RNTI) of all UEs contained in the cell. If DCI includes a TPC command for N UEs, only N UEs need to receive the TPC commands. If TPC commands for all UEs contained in the cell are contained in a DCI, the TPC-ID is used as an ID for all UEs contained in the cell.

The UE monitors an aggregate of PDCCH candidates in a search space contained in a subframe, such that it searches for TPC-ID. In this case, TPC-ID may be found either in a common search space or in a UE-specific search space. The common search space is a search space in which all UEs contained in the cell can perform the searching operation. The UE-specific search space is a search space in which a specific UE can perform the searching operation. If the CRC error is not detected by demasking a TPC-ID in the corresponding PDCCH candidate, a UE can receive a TPC command on a PDCCH.

An identifier (ID, i.e., TPC-ID) for a PDCCH carrying a plurality of TPC commands is defined. If TPC-ID is detected, the UE receives a TPC command on the corresponding PDCCH. The TPC command is used to adjust transmission (Tx) power of an uplink channel. Therefore, the TPC command can prevent data or information from being transmitted to an eNB due to wrong power control, or can also prevent interference for other UEs.

A method for allowing a BS to perform resource mapping for PDCCH transmission in the 3GPP LTE system will hereinafter be described in detail.

Generally, the BS may transmit scheduling allocation information and other control information over the PDCCH. Information about a physical control channel (PCCH) is configured in the form of one aggregate (one aggregation) or several CCEs, such that the resultant information is transmitted as one aggregate or several CCEs. Namely, a PDCCH transmission unit of the eNB is a CCE. One CCE includes 9 resource element groups (REGs). The number of RBGs unallocated to either Physical Control Format Indicator Channel (PCFICH) or Physical Hybrid Automatic Repeat Request Indicator Channel (PHICH) is $N_{RBG}$. CCEs from 0 to $N_{CCE}-1$ may be available to a system (where, $N_{CCE}=\lfloor N_{REG}/9 \rfloor$). PDCCH supports multiple formats as shown in the following Table 2. One PDCCH composed of n contiguous CCEs begins with a CCE having 'i mod n=0' (where 'i' is a CCE number). Multiple PDCCHs may be transmitted through one subframe.

TABLE 2

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 2, an eNode B (eNB) may decide a PDCCH format according to how many regions are required for the BS to transmit control information. The UE reads control information and the like in units of a CCE, resulting in reduction of overhead.

Referring to FIG. 4(b), an uplink (UL) subframe may be divided into a control region and a data region in a frequency domain. The control region may be assigned to a Physical Uplink Control Channel (PUCCH) carrying uplink control information (UCI). The data region may be assigned to a Physical Uplink Shared Channel (PUSCH) carrying user data. In order to maintain single carrier characteristics, one UE does not simultaneously transmit PUCCH and PUSCH. PUCCH for one UE may be assigned to a Resource Block (RB) pair in one subframe. RBs of the RB pair occupy different subcarriers in two slots. The RB pair assigned to PUCCH performs frequency hopping at a slot boundary.

A method for allowing the BS of an LTE system to transmit a PDCCH to the UE will hereinafter be described in detail.

The BS determines a PDCCH format according to Downlink Control Information (DCI) to be sent to the UE, and attaches a Cyclic Redundancy Check (CRC) to control information. A unique identifier (e.g., a Radio Network Temporary Identifier (RNTI)) is masked onto the CRC according to PDCCH owners or utilities. In case of a PDCCH for a specific UE, a unique ID of a UE, for example, C-RNTI (Cell-RNTI) may be masked onto CRC. Alternatively, in case of a PDCCH for a paging message, a paging indication ID (for example, R-RNTI (Paging-RNTI)) may be masked onto CRC. In case of a PDCCH for system information (SI), a system information ID (i.e., SI-RNTI) may be masked onto CRC. In order to indicate a random access response acting as a response to a UE's random access preamble transmission, RA-RNTI (Random Access-RNTI) may be masked onto CRC. The following Table 3 shows examples of IDs masked onto PDCCH.

TABLE 3

| Type | Identifier | Description |
|---|---|---|
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

If C-RNTI is used, PDCCH may carry control information for a specific MS. If another RNTI is used, PDCCH may carry common control information that is received by all or some MSs contained in the cell. The BS performs channel coding of the CRC-added DCI so as to generate coded data. The BS performs rate matching according to the number of CCEs allocated to a PDCCH format. Thereafter, the BS modulates the coded data so as to generate modulated symbols. In addition, the BS maps the modulated symbols to physical resource elements.

3GPP (3rd Generation Partnership Project) may refer to the next-generation wireless communication system as the LTE-A system, such that it can satisfy a future-oriented service request. The LTE-A system employs carrier aggregation (CA) technology, and multiple component carriers (CCS) are aggregated for transmission, such that a transmission bandwidth of a UE is increased and the use efficiency of a frequency is also increased. The LTE-A system simultaneously combines multiple carriers instead of a single carrier used in the legacy LTE Rel 8/9, and uses the combined carriers, such that the bandwidth can be extended up to 100 MHz. In other words, a carrier defined up to a maximum of 20 MHz in the legacy LTE Rel 8/9 is re-defined as a component carrier (or a component carrier), such that one UE can use a maximum of 5 component carriers (CCs) using carrier aggregation technology.

The current carrier aggregation (CA) (or carrier integration) technology has the following characteristics.

(1) Aggregation of contiguous component carriers (CCs) is supported, and aggregation of non-contiguous CCs is supported.

(2) The number of UL carrier aggregations (CAs) may be different from the number of DL CAs. If it is necessary for the current CA technology to be compatible with the previous system, UL and DL must configure the same number of CCs.

(3) Different numbers of CCs are configured in UL and DL such that different transmission bandwidths can be obtained.

(4) In association with the UE, each CC independently transmits one transport block, and an independent hybrid automatic repeat request (HARQ) mechanism is used.

Differently from the legacy LTE system designed to use one component carrier (CC), it is necessary for a carrier aggregation (CA) system using a plurality of CCs to effectively manage component carriers (CCs). In order to effectively manage CCs, the CCs can be classified according to their roles and characteristics. CCs may be classified into a primary component carrier (PCC) and a secondary component carrier (SCC). The PCC is used as a center component carrier of CC management when multiple CCs are used, and one PCC is allocated to one UE. The PCC may also be referred to as a primary cell (PCell).

Other CCs other than one PCC are defined as secondary component carriers (SCCs). SCC may also be referred to as a secondary cell (SCell). The PCC is a kernel carrier that manages all integrated CCs, and the remaining SCCs may provide additional frequency resources to achieve a high transfer rate. For example, the eNode B may achieve RRC for signaling with a UE through a primary component carrier (PCC). Information for security and higher layer signaling may also be achieved through a PCC. Indeed, if there is only one CC, the corresponding CC may be used as a PCC. In this case, the corresponding CC may perform the same role as a carrier of the legacy LTE system.

The BS may allocate an activated component carrier (ACC) from among multiple CCs to a UE. The UE can recognize the ACC allocated to the UE itself. In accordance with the present invention, the UE must report a power headroom report (PHR) to the BS according to each carrier of ACCs allocated to the UE itself. However, in association with an unscheduled carrier from among one or more ACCs allocated to the UE, the UE may transmit a virtual PHR to the unscheduled carrier.

In order to allow the UE to perform a power headroom report according to the carrier aggregation (CA) technology applied to the LTE-A system, a method for allowing the BS to signal a power control message to the UE will hereinafter be described in detail.

In accordance with the current standards (3GPP TS 36.321, 36.213, 36.133), medium access control (MAC) elements transmitted from the UE include a buffer status report (BSR) control element and a power headroom report (PHR) control element. The BSR control element is generated by a buffer status report process, such that it reports the amount of data contained in an uplink buffer to the eNB acting as the service provider. The PHR control element is generated by the PHR process, such that the UE reports a current power status (i.e., the amount of remaining power) to the eNB. The eNB can effectively distribute radio resources according to information regarding both a UE-reported uplink buffer status and a power headroom, and can also decide scheduling.

Generally, the UE can trigger the power headroom report (PHR) in case of generating the following events (1) and (2).

(1) A timer (prohibitPHR-Timer) for prohibiting the power headroom report stops operation, and the change of transmission path loss using a UE is greater than a predetermined value (DL_PathlossChange).

(2) If a periodic report timer (PeriodicPHR-Timer) has expired, this situation is referred to as periodic PHR. After the power headroom report is generated, assuming that the UE includes newly-transmitted uplink transmission resources distributed by the eNB in a current transmission time period, the PHR control element is generated from the power headroom value obtained from a physical layer, and the timer (prohibitPHR-Timer) is driven again.

Provided that the periodic power boundary headroom report is generated, the periodic report timer (PeriodicPHR-Timer) is driven again. In association with the detailed operations of the power headroom report (PHR) process, it may be necessary to refer to associated technology standards (3GPP TS 36.321, 36.213, 36.133).

There are two kinds of power headroom reports (PHRs) reported from the UE to the BS. That is, the power headroom reports (PHRs) are classified into Type 1 PHR (where PHR=Pcmax−$P_{PUSCH}$) and Type 2 PHR (where PHR=Pcmax−$P_{PUCCH}$−$P_{PUSCH}$). Pcmax is a maximum power value for UE transmission per component carrier (CC), and may also be represented by Pcmax,c including a CC index. $P_{PUSCH}$ is a power value used for PUSCH transmission. Type 2 PHR may be defined as "PHR=Pcmax−$P_{PUCCH}$−$P_{PUSCH}$". Likewise, Pcmax is a UE transmission maximum power value configured per CC, $P_{PUSCH}$ is a power value used for PUSCH transmission, and $P_{PUCCH}$ is a power value used for PUCCH transmission.

In association with PHR reporting of the UE, a maximum power reduction (MPR) value may be considered. If PHR is requested by RAN2, a variety of information (for example, triggers for PHR, information as to whether two types of PHRs are transmitted in the same or different subframes, a bit size used for PHR, and information as to which one of CCs is used for PHR transmission) may be discussed. Type 2 PHR for a subframe through which PUCCH is not actually transmitted may be derived from RAN2, and PUCCH format 1A is used as a reference format. When Type 2 PHR is derived for a subframe via which PUCCH is transmitted, PUCCH format for Type 2 PHR is a PUCCH format that is actually transmitted.

Contents associated with a PHR in RAN 2 will hereinafter be described in detail.

One 'dl-PathlossChange' parameter must be assigned per UE. One 'periodicPHR-Timer' timer must be assigned per UE and is composed of only one value, and only one timer valid for the UE in all CCs may be used. The UE is configured to transmit a PHR on an arbitrary UL CC. For example, PHR of CC1 may be transmitted on CC2. In addition, only one 'prohibitPHR-Timer' value is configured. One timer running is assigned per CC.

In addition, the UE may transmit a PHR of Scell to the BS using Type 1 PHR. If parallel PUCCH and PUSCH allocation is not supported by PCell, Type 1 PHR may be used for PCell and SCell. PHR is the same as in Rel-8/9. In contrast, provided that parallel PUCCH and PUSCH allocation is supported and PUCCH and PUSCH transmission is present on PCell at TTI, the UE can transmit both Type 1 PHR and Type 2 PHR to the BS in PCell.

Provided that parallel PUCCH and PUSCH allocation is supported and only PUSCH transmission is present in PCell at TTI, the UE may simultaneously transmit Type 1 PHR and Type 2 PHR to the BS in PCell, or may transmit only Type 1 PHR to the BS. Provided that parallel PUCCH and PUSCH allocation is supported and only PUCCH transmission is present in PCell at TTI, the UE may not transmit a PHR in PCell. When a PHR report is triggered, the UE may report a PHR for all configured CCs.

The configured maximum UE output power ($P_{CMAX}$) may be represented by the following equation 1, and may be limited.

$$P_{CMAX\_L} - T(P_{CMAX\_L}) \leq P_{CMAX} \leq P_{CMAX\_H} \leq T(P_{CMAX\_H})$$ [Equation 1]

In Equation 1, $P_{CMAX\_L}$ is defined as '$P_{CMAX\_L}$ = MIN$\{P_{EMAX\_H} - T_C, P_{PowerClass} - MPR - A - MPR - \Delta T_C\}$', $P_{CMAX\_H}$ is defined as '$P_{CMAX\_H}$=MIN$\{P_{EMAX\_H}, P_{PowerClass}\}$', and T($P_{CMAX}$) is defined as '$P_{CMAX}$ tolerance' of Table 4. $P_{CMAX\_L}$ and $P_{CMAX\_H}$ may be applied independently of each other. $P_{EMAX\_H}$ is a value given by IE P-Max defined in 3GPP TS 36.214. $P_{PowerClass}$ is a maximum UE power in which no tolerance is considered. $P_{PowerClass}$ may be transferred from the BS to the UE. A-MPR may be signaled from the BS to the UE. $\Delta T_C$ may be pre-defined. $T_C$ may be 1.5 dB ($T_C$=1.5 dB) or zero ($T_C$=0).

TABLE 4

| $P_{CMAX}$(dBm) | Tolerance T($P_{CMAX}$)(dB) |
| --- | --- |
| 21 ≤ $P_{CMAX}$ ≤ 23 | 2.0 |
| 20 ≤ $P_{CMAX}$ < 21 | 2.5 |
| 19 ≤ $P_{CMAX}$ < 20 | 3.5 |
| 18 ≤ $P_{CMAX}$ < 19 | 4.0 |
| 13 ≤ $P_{CMAX}$ < 18 | 5.0 |
| 8 ≤ $P_{CMAX}$ < 13 | 6.0 |
| −40 ≤ $P_{CMAX}$ < 8 | 7.0 |

A power headroom (PH) of a UE valid for the subframe having an index (i) is defined as the following Equation 2, and Equation 2 corresponds to Type 1 PHR.

$$PH(i) = P_{CMAX} - \{10 \log_{10}(M_{PUSCH}(i)) + P_{O\_PUSCH}(j) + \alpha(j) \cdot PL + \Delta_{TF}(i) + f(i)\} [dB]$$ [Equation 2]

In Equation 2, $P_{CMAX}$ is configured transmission power of the UE. $M_{PUSCH}(i)$ is a parameter for indicating a PUSCH resource allocation bandwidth denoted by the number of resource blocks valid for the subframe (i), and is allocated by the BS. $P_{O\_PUSCH}(j)$ is a parameter composed of the sum of a cell-specific nominal component $P_{O\_NOMINAL\_PUSCH}(j)$ supplied from a higher layer and a UE-specific component $P_{O\_UE\_PUSCH}(j)$ received from a higher layer, and $P_{O\_PUSCH}(j)$ is supplied from the BS to the UE. $\alpha(j)$ is supplied from a higher layer, and is a cell-specific parameter supplied from a higher layer and transmitted as 3 bits by the BS. If j=0 or j=1, $\alpha \in \{0, 0.4, 0.5, 0.6, 0.7, 0.8, 0.9, 1\}$ is given. If j=2, $\alpha(j)$=1 is given. $\alpha(j)$ is transmitted from the BS to the UE.

PL is a downlink pathloss (or signal loss) estimation value calculated on a dB basis, and PL is denoted by "PL=referenceSignalPower−higher layer filteredRSRP". f(i) is a value for indicating the present PUSCH power control state, and may be represented by a current absolute value or an accumulated value.

A power headroom (PH) is composed of 64 level values arranged at intervals of 1 dB in the range from −23 dB to 40 dB, and is transmitted to a higher layer through a physical layer. PH MAC control element (CE) is identified by the MAC PDU sub-header. An exemplary power headroom (PH) reported from the UE to the BS is shown in Table 5.

TABLE 5

| PH | Power Headroom Level |
| --- | --- |
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

The BS may allocate an activated component carrier (ACC) from among a plurality of component carriers (CCs) to the UE. The UE may recognize the activated component carrier (ACC) allocated to the UE itself through pre-signaling or the like.

PUCCH formats defined in 3GPP LTE Rel-8 and UE uplink transmission power will hereinafter be described in detail. PUCCH is a UL control channel for carrying UL control information, and it is impossible for the LTE system to simultaneously transmit PUCCH and PUSCH due to single-carrier characteristics. However, as multiple carriers (multi-carrier) are introduced into the LTE-A system, PUCCH can be transmitted along with a PUSCH at a specific component carrier [for example, a primary component carrier (PCell)]. PUCCH supports a plurality of formats, and a PUCCH format supported by LTE Release 8 is shown in the following Table 6. In this case, PUCCH formats 2a and 2B support only a normal CP.

TABLE 6

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

From the viewpoint of the above-mentioned conclusion of RAN1 and RAN2 and additional discussion matters, it is necessary for the BS to receive a PHR per CC and a PHR per UE from the UE, because the BS has difficulty in recognizing UE maximum power limitation on the basis of only PHR information per CC. That is, it is impossible for the BS to recognize a power level of scheduled PUSCH/PUCCH(s). Because the BS is unable to recognize maximum power of a specific component carrier (such as $P_{CMAX,c}$) constructing a per-CC PHR, the above-mentioned problems occur. Therefore, detailed methods for supporting the above-mentioned operations are needed. For example, a method for configuring PHR information, an operation method, and a method for transmitting UE information may be used.

The present invention provides the PHR information configuration method, the operation method, and the method for transmitting UE information to the UE and BS supporting a DL/UL multicarrier system.

The UE may report a power headroom (PH) for each CC to the BS using Type 1 PHR and Type 2 PHR. The BS may determine a resource allocation method required for the next scheduling of the corresponding UE using per-CC PHR information. However, the BS has difficulty in estimating UE maximum power limitation using Type 1 PHR and Type 2 PHR of per-CC PHR. Due to the above-mentioned problems, a PHR for each UE is also required. However, for the role of a UE PHR, it is necessary for $P_{CMAX}$ shown in Equation 3 to be defined as a value known to the BS. $P_{CMAX}$ is a UE-specific value or a common value. If $P_{CMAX}$ is not known to the BS, although the UE PHR for each UE is transmitted to the BS, there may still exist uncertainty as to whether the BS can recognize UE maximum power limitation.

$$\sum_c w_c \cdot P_{PUSCHc}(i) \leq P_{CMAX} - P_{PUCCH}(i) \quad \text{[Equation 3]}$$

In Equation 3, each of $P_{CMAX}$, $P_{PUSCHc}(i)$ and $P_{PUSCHc}(i)$ is a linear value different from the above-mentioned $P_{cmax}$. If $P_{CMAX}$ is not known to the BS, the BS may have difficulty in recognizing UE maximum power limitation on the basis of the per-CC PHR. In contrast, if $P_{CMAX}$ is known to the BS, for example, if a fixed value (such as $P_{UMAX}$) indicating a system dependent maximum power level ($P_{UEMAX}$) transmitted through higher layer signaling min$\{P_{UEMAX}, P_{UMAX}\text{(power class)}\}$ is known to the BS, per-UE PHR may be meaningful to UE maximum power limitation. In this case, $P_{UMAX}$ is a modulation order, and indicates a UE maximum power having both a network signaling value and a power reduction caused by a peripheral position of a band edge. If IE P-Max is not signaled, $P_{UMAX}$ is identical to $P_{CMAX}$.

$P_{CMAX,c}$ is needed when Type 1 PHR and Type 2 PHR of per-CC PHR are calculated. The UE may select $P_{CMAX,c}$ from among a low boundary value and a high boundary value in the same manner as $P_{CMAX}$ defined in LTE Rel 8/9, because Maximum Power Reduction (MPR) [(modulation level and scheduled bandwidth (i.e., the size of resource)], A-MPR (Additional MPR) (additional power reduction value depending upon whether a contiguous CC is transmitted), and $\Delta T_C$ (delta Tolerance) (In case of FUL_low, FUL_low+4 MHz and FUL_high, and FUL_high-4 MHz, reduction of 1.5 dB is achieved.) are applied according to each transmission scenario.

One of three elements (MPR, A-MPR, $\Delta T_C$) is not known to the BS, such that the UE is unable to recognize a maximum power level for each CC. That is, the BS does not recognize which one of transmission power levels is used by the UE. If a PHR for each UE is needed due to the above-mentioned reason, $P_{CMAX}$ needs to be defined as a value known to the BS as represented by Equation 2. The BS must estimate whether Equation 2 is satisfied such that the BS can easily perform the next scheduling while simultaneously solving the problem caused by only per-CC PHR. In the present invention, the term "per-UE PHR" is represented by the following equation 4 in a different way from Type 1 PHR and Type 2 PHR.

$$\text{PHR per UE} = P_{UEMAX} - X \quad \text{[Equation 4]}$$

In Equation 4, $P_{UEMAX}$ is a total of maximum power of the UE, and X may be any one of (1) the sum of all scheduled PUSCH powers, (2) the sum of all scheduled PUCCHs, (3) the sum of PUSCHs in all unscheduled Scells, (4) the sum of PUCCHs of unscheduled PCell, and (5) a combination of the (1) to (4) items.

As can be seen from Equation 4 and the above description, $P_{UEMAX}$ may be defined as a calculation between the sum of scheduled PUSCH/PUCCH powers and a value ($P_{UEMAX}$) known to the BS. If information regarding unscheduled CCs is needed, power information regarding the unscheduled CCs may be partially or entirely included so that a per-UE PHR can be configured.

An embodiment for UE PHR transmission related to Equation 4 will hereinafter be described in detail.

In respective scheduled SCells (i.e., the remaining cells or CCs other than PCell), the UE transmits Type 1 PHR. In PCell (i.e., primary cell), the UE may simultaneously transmit Type 1 PHR and Type 2 PHR, and may transmit a per-UE PHR corresponding to Equation 4 in consideration of only the sum of scheduled PUSCH/PUCCH powers (i.e., a combination of the (1) and (2) items).

In case of the system capable of transmitting a PUCCH only in PCell, it is necessary for the BS to recognize PHR information or transmission power level of PUCCH. From the viewpoint of UE maximum power, the PHR information and transmission power level of PUCCH can be utilized in the next scheduling. A method for utilizing power of a scheduled PUCCH may be used according to whether PUCCH transmission is achieved during PHR triggering, or a method for utilizing a PUCCH power value as a predetermined reference format under a non-scheduled situation may be used. Of course, it is also possible to use a method for utilizing only the reference format irrespective of transmission or non-transmission of PUCCH. Alternatively, a combination of the above methods may also be used as necessary.

The per-UE PHR defined in Equation 4 may always be transmitted by the UE, and may also be transmitted only when Type 1 PHR and Type 2 PHR are simultaneously transmitted. In each of PCell and SCell, the UE transmits only Type 1 PHR, and may define a new value obtained when PUCCH power is subtracted from a value known to the BS and UE under the condition that per-CC PHR and per-UE PHR is configured. In this case, PUCCH power may be configured as various combinations as described above.

Figure 5:
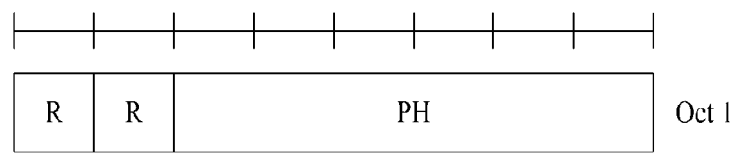
FIG. 5 is a configuration diagram illustrating a PHR MAC CE (Control Element) for use in 3GPP LTE Rel-8/9 acting as an exemplary mobile communication system.
Figure 6:
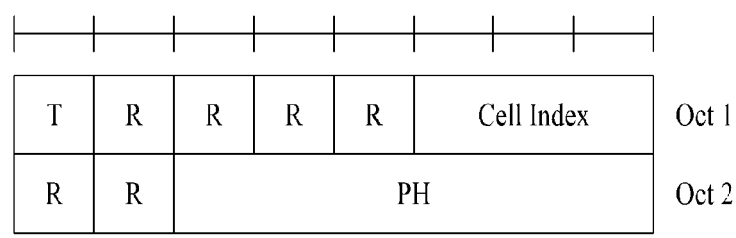
FIG. 6 is a configuration diagram illustrating a PHR MAC CE for use in 3GPP LTE Rel-10 acting as an exemplary mobile communication system.

A method for constructing PHR information when the UE transmits a PHR will hereinafter be described in detail. A method for constructing PHR information may be configured as a combination of all the following methods and the used. FIG. 5 is a configuration diagram illustrating a PHR MAC CE (Control Element) for use in 3GPP LTE Rel-8/9 acting as an exemplary mobile communication system. FIG. 6 is a configuration diagram illustrating a PHR MAC CE for use in 3GPP LTE Rel-10 acting as an exemplary mobile communication system.

First, the UE may use the per-UE PHR as the legacy PHR MAC CE format. The per-UE PHR may have nothing to do with which one of UL CCs is used for UE transmission. As can be seen from FIG. 5, 6 bits from among 8 bits of the legacy PHR are used for PH distinction, and 2 bits remain as reserved room (R), such that the same format as PHR of an LTE Rel-8/9 UE is reused. As a result, the UE can discriminate between a PHR of LTE Rel-8/9 UE and a PHR for each UE using the remaining one or two bits.

In this case, Type 1 PHR and Type 2 PHR may be defined as a new-type PHR MAC CE format as shown in FIG. 6, such that the case of information transmission through another UL CC can be supported. If PHR information is configured as shown in FIG. 6, 16 bits can be used, the UE may use only one bit (denoted by 'T') to identify a PHR type (i.e., Type 1 PHR or Type 2 PHR), and may use 3 bits (i.e., a field denoted by 'cell index') to identify a CC index. Of course, the number of CCs or like may be extended using reserved bits (field denoted by 'R').

In summary, when several PHRs (Type 1 PHR, Type 2 PHR, and a combination of per-UE PHRs) to be transmitted from the UE to the BS are configured per CC, the per-UE PHR may be used as either the format of FIG. 5 or a modified format of FIG. 5, and the format of FIG. 6 may be used as a per-CC PHR configuration. Alternatively, if a per-UE PHR and a per-CC PHR are used as shown in FIG. 6, the number of bits for discriminating a PHR type is increased to 2, such that Type 1 PHR, Type 2 PHR, and per-UE PHR can be distinguished from each other and the transmitted to the BS. In this case, a cell index field (i.e., CC index field) of the per-UE PHR may be replaced with a reserved bit or may also be used for other purposes. In addition, provided that cross-carrier scheduling for PHR is not applied, Type 1 PHR, Type 2 PHR and per-UE PHR are discriminated and used using 2 reserved bits of the legacy 8-bit PHR shown in FIG. 5

Figure 7:
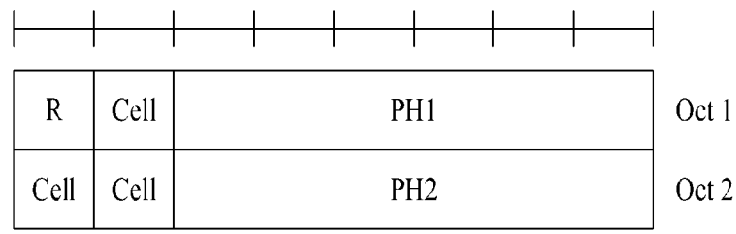
FIG. 7 is a configuration diagram illustrating a PHR MAC CE for use in 3GPP LTE Rel-10 acting as an exemplary mobile communication system.

FIG. 7 is a configuration diagram illustrating other example of PHR MAC CE for use in 3GPP LTE Rel-10 acting as an exemplary mobile communication system.

3GPP LTE Rel-10 PHR MAC CE may be configured as shown in FIG. 7. While the amount of PHR MAC CE information is increased to 16 bits as compared to the legacy art, two types of PH information can be configured using only one PHR MAC CE. Referring to FIG. 7, a CC index is composed of 3 bits (field denoted by 'cell'), and the UE can distinctively transmit a maximum of 8 UL CCs. Provided that simultaneous transmission of Type 1 PHR and Type 2 PHR is needed under the condition that the CC index is a UL primary CC, necessary information must be configured according to methods predefined in PH1 and PH2. For example, the UE may include Type 1 PHR information in a field 'PH1' and include Type 2 PHR information in a field 'PH2', and may then transmit the resultant fields to the BS.

In another CC (i.e., SCell corresponding to a CC in which the UE has only to transmit only Type 2 PHR) instead of a primary UL CC, the UE may transmit Type 2 PHR at only one of PH1 and PH2, and may empty one field (for example, PH1). Alternatively, the UE may not empty the field PH1, may configure per-UE PHR information at an empty place obtained by PH configuration, and transmit the resultant information to the BS. In FIG. 7, a field 'R' may denote a reserved bit, a field 'Cell' may denote a CC index, and a PH field may denote Type 1 PHR information or Type 2 PHR information.

Figure 8:
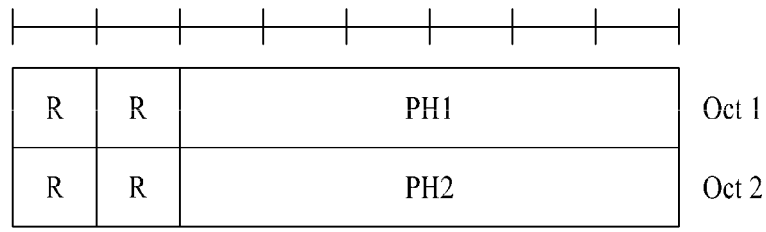
FIG. 8 is a configuration diagram illustrating PHR MAC CE format 1 for PCell to be applied to 3GPP LTE Rel-10 acting as an exemplary mobile communication system.
Figure 9:
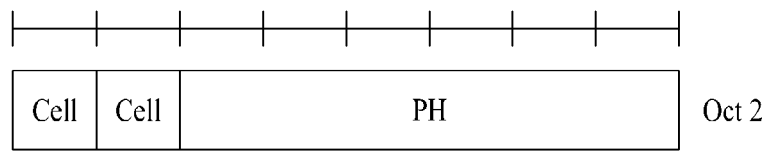
FIG. 9 is a configuration diagram illustrating PHR MAC CE format 2 for SCell to be applied to 3GPP LTE Rel-10 acting as an exemplary mobile communication system.

FIG. 8 is a configuration diagram illustrating PHR MAC CE format 1 for PCell to be applied to 3GPP LTE Rel-10 acting as an exemplary mobile communication system. FIG. 9 is a configuration diagram illustrating PHR MAC CE format 2 for SCell to be applied to 3GPP LTE Rel-10 acting as an exemplary mobile communication system.

The PHR formats shown in FIGS. 8 and 9 are classified into a PHR format for PCell and a PHR format for SCell. In PCell, the UE needs to simultaneously or independently transmit different types of two PHR information. In this case, PHR MAC CE format 1 shown in FIG. 8 may be used. In contrast, the UE need not transmit all of Type 1 PHR and Type 2 PHR within Scell, and has only to transmit a PHR value for each CC, such that PHR MAC CE format 2 shown in FIG. 8 can be used. In FIG. 9, the UE uses 2 reserved bits (field denoted by 'R') for use in 3GPP LTE Rel 8/9 to identify each CC index. Although 2 bits are transmitted through different UL CCs, the BS can easily discriminate between the 2 bits because a maximum of 5 UL CCs can be supported. In this case, per-UE PHR information may use the format of FIG. 5 or a modified format of FIG. 5.

Figure 10:
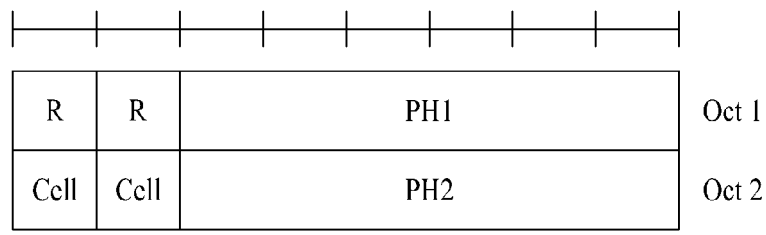
FIG. 10 is a configuration diagram illustrating PHR MAC CE format for use in 3GPP LTE Rel-10 acting as an exemplary mobile communication system.

FIG. 10 is a configuration diagram illustrating PHR MAC CE format for use in 3GPP LTE Rel-10 acting as an exemplary mobile communication system.

PHR MAC CE format shown in FIG. 10 corresponds to some modification of the PHR MAC CE format shown in FIG. 7. For example, the size of 'R' field is increased to 2 bits, and the size of 'Cell' field is reduced to 2 bits. That is, the PHR MAC CE format of FIG. 10 is composed of 16 bits, 2 bits are used as reserved bits (field denoted by 'R') and 2 bits are used as CC index bits (field denoted by 'cell'), and the positions of these bits may be configured as a variety of combinations. If PHRs defined as Type 1 PHR and Type 2 PHR are transmitted at a CC (for example, PCC or PCell) used for PUCCH transmission, the positions of PH1 and PH2 must be defined and used according to the predetermined method. In case of CCs (for example, SCC or SCell) at which only Type 2 PHR is transmitted, only one field from among PH1 and PH2 fields is used by the predetermined method, the other one field (for example, PH 1) remains empty, or a per-UE PHR may also be contained in the empty field and then transmitted as necessary.

When Type 1 PHR/Type 2 PHR or additional types are defined in the format for constructing all 3GPP LTE Rel-10 PHR MAC CEs, no scheduled PUSCH/PUCCH exists. The UE may configure a PH using a reference format (i.e., PHR MAC CE format prescribed in the BS and UE). An indicator (composed of one or more bits) for discriminating the reference format may be needed for PHR configuration. As a result, the BS determines whether or not the reference format is used using the indicator, and reflects the resultant information into the next scheduling. In this case, the indicator may use reserved bits (field denoted by 'R') according to the above-mentioned methods.

CC-specific method or UE-common method can be applied to a logical channel ID (LCID) for PHR of each CC.

In summary, only one PHR MAC CE format may be defined and used, or various PHR MAC CE formats may be defined and used. If PHR triggering occurs in the configured CCs, the UE must perform PHR reporting. In this case, it should be noted that the UE can perform PHR reporting only when PUSCH is allocated to at least one UL CC from among the configured CCs. In other words, when PHR triggering occurs, no PUSCH transmission occurs in at least one of the configured CCs, the UE does not perform PHR reporting. In this case, the UE may not report both a PHR for each UE and a PHR for each CC. Under this situation, the UE must simultaneously transmit PHRs of individual UEs. That is, if one or more PUSCHs are transmitted, the UE transmits a UE PHR, so that the BS can easily perform the next scheduling at multiple UL CCs.

If multiple configured CCs exist and PHR triggering occurs, transmission of PHRs of all the configured CCs may be helpful to improve the system performance. However, PH information is basically transmitted along with PUSCH UL transmission. If there is a relatively small number of scheduled PUSCHs, the amount of control overhead is increased so that it may be difficult to simultaneously transmit the control overhead. The UE and the BS may determine whether PH reporting of only CCs scheduled by a function between the number of scheduled PUSCHs and the number of configured CCs will be carried out or PH reporting of all the CCs will be carried out.

Due to the above-mentioned increased amount of information, a reference PHR as well as the above-mentioned format type are transmitted, and a difference between the corresponding CC and the remaining CCs is implicitly and explicitly configured so that the resultant information may be reported to the BS.

In another example, the UE may define a compact PHR MAC CE format, may transmit the PHR MAC CE format using a smaller number of bits than those of the legacy PHR, or may transmit PHRs of several CCs using the same number of bits.

The UE may omit PHR transmission for Scell as necessary. PHRs of the remaining CCs other than the corresponding CC may not be transmitted only when PHR must be transmitted to only one CC. In this case, the same PHR transmission procedure and method as in the legacy Rel-8 may be used.

The UE may report a per-UE PHR or MPR (hereinafter MPR and A-MPR will be referred to as one term 'MPR') to the BS at a specific time, and a detailed description of the specific time for this UE reporting will hereinafter be described in detail. The specific time may be used to minimize UL scheduling overhead. Some parts from among the above-mentioned contents have disclosed a PHR transmission method used when PHR triggering occurs. In more detail, UE PHR reporting is possible only when at least one PUSCH from among multiple UL CCs is transmitted. In this case, information regarding a method for transmitting a per-CC PHR of all CCs and information regarding a method for transmitting only PHRs of the actually allocated CCs may be included in transmission information. However, the UE may have difficulty in sending various types of PHRs as necessary. In order to solve this problem, the specific time at which a per-UE PHR is sent can be defined as follows.

First, the UE may transmit a per-UE PHR whenever MPR is changed to another. In this case, the UE may report MPRs of all-, some-, or specific-UL CCs to the BS, such that the amount of overhead can be reduced when MPR may be changed to a static or semi-static MPR. In this case, per-UE PHR information may be signaled through a physical layer or higher layer.

Second, the UE may transmit a per-UE PHR at another time (hereinafter referred to as a second time) at which MPR is changed and a per-CC PHR is transmitted. As a result, the UE can transmit a per-UE PHR to the BS at the second time. For example, MPR may be changed in the past including a specific time at which the per-CC PHR is transmitted.

Third, the UE may transmit a per-UE PHR at another time (hereinafter referred to as a third time). That is, the UE can transmit a per-UE PHR at a third time at which simultaneous transmission occurs at two or more UL CCs. Even in this case, the UE may report MPRs of all-, some-, or specific-UL CCs to the BS, such that the amount of overhead can be reduced when MPR may be changed to a static or semi-static MPR. In this case, per-UE PHR information may be signaled through a physical layer or higher layer. In addition, although MPR is changed at a specific time at which simultaneous transmission occurs at two or more UL CCs, the UE can transmit the per-UE PHR to the BS.

For example, it is assumed that PUSCH is transmitted at CC1 and at the same time PUSCH is transmitted at CC2. Under the condition that the UE can transmit PUSCH and PUCCH at PCell (Primary CC) simultaneously while transmitting PUSCH at Scell, the UE transmits only PUCCH at PCell. In this case, if PHR reporting is not performed, PHR occurs only in SCell. In contrast, provided that the UE always transmits Type 1 PHR and Type 2 PHR, transmission of the per-UE PHR is very meaningful although only PUCCH transmission is used.

The UE can report the above-mentioned method for transmitting the per-UE PHR and an MPR value for each CC to the BS. For example, it is assumed that two UL CCs (CC 1 and CC 2) exist. In this case, it is assumed that P1 is a total power of CC 1, PHR 1 is a PH of CC 1, MPR 1 is a total MPR of CC 1, P2 is a total power of CC 2, PHR 2 is a PH of CC 2, and MPR 2 is a total MPR of CC 2. As a result, the following equation 5 can be achieved.

$$P1+P2+PHR1+PHR2=Pcmax,1+Pcmax,2+MPR1+MPR2 \quad \text{[Equation 5]}$$

In Equation 5, Pcmax,1 is a UE-configured maximum power at CC 1, and Pcmax,2 is a UE-configured maximum power at CC 2.

Through the relationship of Equation 5, the BS can estimate a UE power situation using an MPR value instead of per-UE PHR. Therefore, the UE may report (MPR1+MPR2), instead of the per-UE PHR, to the BS. In this case, the UE may transmit the MPR value for each CC, or may report the sum of MPR values of CCs to the BS. Information regarding the specific time at which the UE transmits an MPR may be transmitted whenever MPR values are changed, and may also be transmitted at another time at which an MPR value is changed and a per-CC PHR is transmitted. In this case, simultaneous transmission of MPR and per-CC PHR is configured to reuse the conventional method for transmitting information through a higher layer. In contrast, MPR and per-CC PHR may also be fed back through a physical layer.

As is apparent from the above description, according to the embodiments of the present invention, a UE power headroom required for a UE and BS supporting a DL/UL multicarrier system is configured, PHR information per UL CC and PHR information per UE are efficiently configured, resources for the BS can be easily managed, and UE maximum power limitation can be minimized.

Exemplary embodiments described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. Also, it will be obvious to those skilled in the art that claims that are not explicitly cited in the appended claims may be presented in combination as an exemplary embodiment of the present invention or included as a new claim by subsequent amendment after the application is filed.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all changes which come within the equivalent scope of the invention are within the scope of the invention.

INDUSTRIAL APPLICABILITY

The UE apparatus for transmitting a power headroom report (PHR) supporting multiple component carriers and a method for the same according to embodiments of the present invention can be applied to various mobile communication systems, for example, 3GPP LTE, LTE-A, IEEE 802 system, and the like.

The invention claimed is:

1. A method for transmitting a power headroom report (PHR) by a user equipment (UE) in a wireless communication system supporting multiple component carriers comprising:
   transmitting PHR information for each of at least one component carrier (CC) and Maximum Power Reduction (MPR) information of the UE to a base station (BS),
   wherein the PHR information for each of the at least one component carrier includes component carrier index information, and
   wherein the MPR information of the UE includes a sum of MPR values of individual component carriers.

2. The method according to claim 1, wherein the PHR information for each of the at least one component carrier further includes power headroom report (PHR) type information.

3. The method according to claim 2, wherein the PHR type includes a first type PHR and a second type PHR, the first type PHR being represented by the following equation A and the second type PHR being represented by the following equation B:

$$\text{Type 1 PHR} = P_{cmax} - P_{PUSCH} \quad \text{[Equation A]}$$

$$\text{Type 2 PHR} = P_{cmax} - P_{PUCCH} - P_{PUSCH} \quad \text{[Equation B]}$$

wherein $P_{cm}$ is a UE-configured maximum transmission value per component carrier, $P_{PUSCH}$ is a power value used for PUSCH transmission, and $P_{PUCCH}$ is a power value used for PUCCH transmission.

4. The method according to claim 3, wherein PHR information of a secondary cell (SCell) corresponding to a secondary component carrier (SCC) of the at least one component carrier is the second type PHR.

5. The method according to claim 3, wherein PHR information of a primary cell (PCell) corresponding to a primary component carrier (PCC) of the at least one component carrier includes the first type PHR and the second type PHR.

6. The method according to claim 2, wherein the PHR information for each of the at least one component carrier (per-CC PHR information) and per-UE PHR information are transmitted through the same PHR MAC CE (Control Element) format.

7. The method according to claim 6, wherein the PHR MAC CE format includes a field for a PHR value and a field for discriminating between the per-CC PHR information and the per-UE PHR information.

8. The method according to claim 7, wherein:
   the PHR MAC CE format for the PHR information for each of the at least one component carrier further includes a field including the component carrier index information, and
   the field for the PHR value includes at least one of a first type PHR value and a second type PHR value.

9. The method according to claim 8, wherein the at least one component carrier is all component carriers allocated to the UE or a scheduled component carrier.

10. The method according to claim 1, wherein PHR information for each of the at least one component carrier or the UE MPR information is transmitted when PUSCH transmission occurs in a specific component carrier from among the at least one component carrier.

11. The method according to claim 1, further comprising:
    transmitting per-UE PHR information to the base station (BS),
    wherein the per-UE PHR information corresponds to a value obtained when any one of a sum of scheduled Physical Uplink Shared Channel (PUSCH) powers, a sum of scheduled Physical Uplink Control Channels (PUCCHs), a sum of PUSCHs at an SCell corresponding to a unscheduled secondary component carrier, and a sum of PUCCHs of a PCell corresponding to a unscheduled primary component carrier is subtracted from a predetermined total maximum power of the UE.

12. A user equipment (UE) apparatus for transmitting a power headroom report (PHR) in a wireless communication system supporting multiple component carriers comprising:
    a transmitter configured to transmit PHR information for each of at least one component carrier (CC) and Maximum Power Reduction (MPR) information of the UE to a base station (BS),
    wherein the PHR information for each of the at least one component carrier includes component carrier index information, and
    wherein the MPR information of the UE includes a sum of MPR values of individual component carriers.

13. The UE apparatus according to claim 12, wherein the PHR information for each of the at least one component carrier further includes power headroom report (PHR) type information.

14. The UE apparatus according to claim 12, wherein the transmitter further transmits PHR information for each UE (per-UE PHR information) to a base station (BS), wherein the PHR information for each of the at least one component carrier (per-CC PHR information) and the PHR information for each UE (per-UE PHR information) are transmitted through the same PHR MAC CE (Control Element) format.

15. The UE apparatus according to claim 14, wherein the PHR MAC CE format includes a field for a PHR value and a field for discriminating between the per-CC PHR information and the per-UE PHR information.

* * * * *